(12) United States Patent
Zhang et al.

(10) Patent No.: US 9,980,353 B2
(45) Date of Patent: May 22, 2018

(54) DEVICE MANAGEMENT

(71) Applicant: PHILIPS LIGHTING HOLDING B.V., Eindhoven (NL)

(72) Inventors: Qi Zhang, Eindhoven (NL); Lin Wang, Eindhoven (NL); Liwen Zhou, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/322,218

(22) PCT Filed: Jun. 19, 2015

(86) PCT No.: PCT/EP2015/063790
§ 371 (c)(1),
(2) Date: Dec. 27, 2016

(87) PCT Pub. No.: WO2016/000981
PCT Pub. Date: Jan. 7, 2016

(65) Prior Publication Data
US 2017/0142811 A1 May 18, 2017

(30) Foreign Application Priority Data

Jun. 30, 2014 (CN) .................. PCT/CN2014/081295
Oct. 3, 2014 (EP) ..................................... 14187658

(51) Int. Cl.
*H05B 37/02* (2006.01)
*G05B 15/02* (2006.01)

(52) U.S. Cl.
CPC ......... *H05B 37/0272* (2013.01); *G05B 15/02* (2013.01); *H05B 37/029* (2013.01); *G05B 2219/2614* (2013.01)

(58) Field of Classification Search
CPC .. H05B 37/0272; H05B 37/029; G05B 15/02; G05B 2219/2614
(Continued)

(56) References Cited

U.S. PATENT DOCUMENTS 3,668,509 A 6/1972 Riebs et al.
8,319,452 B1 11/2012 Hamel et al.
(Continued)

FOREIGN PATENT DOCUMENTS

EP 2521426A1 A1 11/2012
EP 2404484 B1 4/2013
(Continued)

*Primary Examiner* — Don Le
(74) *Attorney, Agent, or Firm* — Akarsh P. Belagodu

(57) ABSTRACT

Proposed is a device management apparatus and method for use in a device management network including a remote device management system. The device management apparatus comprises a communication interface (6) adapted to receive device management commands of differing nature from the remote device management system and to transmit a feedback signal to said remote device management system if requested by said device management commands, wherein the differing nature of a device management command comprises a differing level of power required to process the device management command, wherein the differing level of power required to process the device management command further relates to whether or not the device management command requires the communication interface (6) to transmit the feedback signal. The device management apparatus comprises a power supply (7) adapted to supply power to the communication interface (6) of the device management apparatus and further adapted to operate in a plurality of differing predefined operating modes. The device management apparatus further comprises a control unit (8) adapted to control the power supply to operate in one of the plurality of operating modes based on the nature of a received device
(Continued)

management command, wherein the control unit (8) is adapted to: set the power supply (7) operating under respective predefined switching frequency or duty cycle in a first power mode or in a second power mode of the plurality of differing predefined operating modes.

15 Claims, 4 Drawing Sheets

(58) Field of Classification Search
USPC .......................................................... 315/291
See application file for complete search history.

(56) References Cited

U.S. PATENT DOCUMENTS

| | | |
|---|---|---|
| 2006/0102731 A1 | 5/2006 | Mueller et al. |
| 2013/0247117 A1* | 9/2013 | Yamada ................. G08C 17/02 725/93 |
| 2014/0013540 A1* | 1/2014 | Erko ...................... A47L 9/2857 15/412 |
| 2014/0039579 A1* | 2/2014 | Mashiach ............ A61N 1/0551 607/61 |
| 2014/0167934 A1* | 6/2014 | Fair ........................ G08C 17/02 340/12.32 |
| 2014/0334370 A1* | 11/2014 | Tan ........................ H04L 12/12 370/311 |
| 2014/0368035 A1* | 12/2014 | Lofthouse ............. H02M 3/155 307/31 |
| 2015/0194815 A1* | 7/2015 | Rofe ....................... H02J 5/005 307/104 |

FOREIGN PATENT DOCUMENTS

| | | |
|---|---|---|
| WO | WO2011033432 A1 | 3/2011 |
| WO | WO2013014233 A1 | 1/2013 |
| WO | WO2013081548 A1 | 6/2013 |

* cited by examiner

DEVICE MANAGEMENT

CROSS-REFERENCE TO PRIOR APPLICATIONS

This application is the U.S. National Phase application under 35 U.S.C. § 371 of International Application No. PCT/EP2015/063790, filed on Jun. 19, 2015, which claims the benefit of European Patent Application No. 14187658.1, filed on Oct. 3, 2014 and Chinese Patent Application No. PCT/CN2014/081295, filed on Jun. 30, 2014. These applications are hereby incorporated by reference herein.

FIELD OF THE INVENTION

This invention is generally related to device management, and more particularly to a device management apparatus and method for use in a device management network.

BACKGROUND OF THE INVENTION

It is known to remotely manage a device via a device management network. In such a network, there is typically provided a remote device management system which transmits device management commands to one or more managed devices. The managed device(s) typically transmit information back to the remote device management system so as to keep the remote device management system informed as to operating status or activities of the device(s), for example. Such feedback information from the managed device(s) may then be used by the remote device management system to assess whether or not performance criteria/requirements are being met. Based on such an assessment, the remote device management system may then transmit further device management commands to the managed device(s) in order to modify and/or control device operations/activities.

Accordingly, it is known to employ the concept of remote device management via a device management network in order to meet the demands of power supply and/or distribution.

Further, existing light technologies, such as LED luminaries and drivers, can be controlled to produce dynamic effects, for example.

Controlling lighting systems is typically performed by the use of a remotely positioned light management system or console which outputs a suitable lighting control protocol to the controller(s) associated with the lights. For example, Digital multiplex (DMX) (also known as DMX512) is a control standard which is mainly used in theatre and concert lighting systems. Remote Device Management (RDM) is a protocol enhancement to DMX that allows bi-directional communication between a device (e.g. light) management system and attached RDM compliant devices over a standard DMX line. RDM allows configuration, status monitoring, and management of devices in such a way that does not disturb the normal operation of standard DMX devices that do not recognize the RDM protocol. Art-Net is a protocol for transmitting the control protocol DMX (and with RDM) over the User Datagram Protocol of the Internet Protocol suite. In other words Art-Net is an Ethernet/IP version of DMX, in which multiple DMX universes can be controlled over a standard Ethernet network.

EP2521426A1 discloses using a device having at least two operation modes for remotely controlling and programming the lighting control system. Settings are received via a USB interface 21, and a microcontroller 22 controls a power selector 28 so that a transmitter 26 transmits the settings and control operations using the selected operation mode, i.e. the higher power level or the lower power level.

US20060102731A1 discloses a remote sensor 22 sensing climate conditions at step 100 at predetermined time intervals, if the change in temperature is high or low power transmissions have occurred for several times, the temperature is transmitted in high power to the thermostat transceiver or receiver; otherwise the temperature is transmitted in low power.

SUMMARY OF THE INVENTION

Normally for a transceiver in a device within a device management network, it consumes different power when it receives a signal and when it transmits a signal. For example, when the transceiver receives a signal, it detects the voltage on the communication line/bus and the power used for detection is relatively low; while when it needs to transmit a signal, it needs to manipulate the voltage on the line/bus to pull it high or low and the line/bus it is connected to, as load, the central management system as well as other transceivers. The power used for transmitting signal may therefore be relatively large. There is typically a power supply to provide the different power.

A traditional way of controlling the power supply is closed-loop control, wherein an error amplifier is used for detecting the output of the power supply. When the transceiver consumes more power, the output of the power supply will drop below a reference voltage and the error amplifier detects this drop. A control circuit may then be used to adjust the duty cycle of the switching element in the power supply to provide more power output, until the error amplifier does not sense a difference between the output of the power supply and the reference voltage. This approach requires the closed-loop error amplifier which means high cost. Also, during transition time, the power supply may be unstable or some overshoot or undershoot may occur.

It would be advantageous to achieve a low-cost transceiver with a more stable output power. To better address one or more of these concerns, embodiments of the invention as defined by the claims are provided.

According to an aspect of the invention, there is provided a device management apparatus for use in a device management network including a remote device management system, the device management apparatus comprising: a communication interface adapted to receive device management commands of differing nature from the remote device management system and to transmit a feedback signal to said remote device management system if requested by said device management commands, wherein the differing nature of a device management command comprises a differing level of power required to process the device management command, wherein the differing level of power required to process the device management command further relates to whether or not the device management command requires the communication interface to transmit the feedback signal; a power supply adapted to supply power to the communication interface of the device management apparatus and further adapted to operate in a plurality of differing predefined operating modes; and a control unit adapted to control the power supply to operate in one of the plurality of operating modes based on the nature of the received device management command, wherein the control unit is adapted to: set the power supply operating under respective predefined switching frequency or duty cycle in a first power mode or in a second power mode of the plurality of operating modes.

Embodiments employ the realisation that the nature of a received command may dictate the resources or power required to process or execute/implement the command. By only switching to a high-power mode when the received command requires the use of extra power to reply, for example, a power supply can be used more efficiently. Put another way, by considering the nature of a received command, an operating mode of a power supply can be set according to the associated needs implied by the received management command.

There is thus proposed a concept of device management commands being of differing nature. By the "nature" of a device management command, it is meant the properties of a command that determine or dictate a level of resources or power required in order to process or implement one or more instructions defined by the device management command. For example, the nature of a first command may be that a reply must be transmitted, thus meaning that a first, high level of power is needed to generate and transmit the reply, whereas the nature of a second command may be that no reply is required meaning that a second, low level of power can be used to simply execute the command (without needing to generate and transmit a reply). In another example, the nature of a first command may be that the device needs to use extra power for its MCU to do some calculation work; while the nature of a second command may not. It should be understood that any other kind of command may fall into the scope of the invention as long as it relates to power that is used for processing it.

Unlike conventional concepts, embodiments may not employ a closed-loop feedback/control system. Instead, embodiments may be thought of as employing 'open-loop' wherein the operating mode of the power supply is set based on the nature of a received device management command without information about the operating mode being transmitted back to the remote power management system. Thus, the remote power management system may not be aware of the operating status of the power supply. Put another way, in embodiments, the control unit may operate as a master that sets the operation of the power supply according to requirements that are determined by the control unit (and not by the remote power management system, for example). Of course, the remote power management system may be understood as (indirectly) influencing the operation of the power supply, since it is the remote power management system that sends the device management commands which may ultimately dictate the operating mode of the power supply. Nonetheless, in embodiments, the control unit actually determines the resource requirements (based on the nature received device management commands) and directly controls the power supply based on this determination. There may therefore be no need for a feedback loop with the remote power management system. The embodiment uses an open-loop control to set the power supply operated in a proper operating mode according to the power requirement implied by the device management command, without using a closed-loop control. Thus, the drawbacks of closed-loop control, such as high cost, and instability or overshoot or undershoot can be avoided. That means lower cost and less complexity for the power supply can be achieved.

In an embodiment, the plurality of differing operating modes may comprise: a first power mode in which the power supply is adapted to supply a first level of power to the communication interface of the device management apparatus; and a second power mode in which the power supply is adapted to supply a second level of power to the communication interface of the device management apparatus, wherein the second level of power is greater than the first level of power. A high-power mode and a low-power mode may therefore be employed, for example, so as to meet the different power required by different kinds of command processing.

Also, in one or all the power modes, the level of power supplied may be variable. In this way, Electromagnetic Interference (EMI) performance may be optimised for example. For example, the control unit may be adapted to control the switching frequency or duty cycle of the power supply so as to vary the power supplied by the power supply in an operating mode. The control unit may also be adapted to select an input voltage value for the power supply to make the power supply operate in one of the plurality of operating modes. For example, the normal operating may just be a low power mode that means better EMI performance can be achieved than always operating at high power mode.

In an embodiment, the plurality of differing operating modes may further comprise: a third power mode in which the power supply is adapted to supply a third level of power to the device management apparatus, the third level of power being lower than the first level of power and of a minimal or substantially zero value. A standby or 'sleep mode' may therefore be provided for, wherein the power supply supplies a minimal level of power (e.g. close to zero) for when there is no load for example.

The control unit may be adapted to control the power supply to operate in the predetermined third operating mode when the communication interface is neither receiving nor transmitting. The power supply may therefore revert to a default operating mode when the communication interface is not executing a command. Such a default power mode may be a standby mode that reduces power consumption to a minimum value, or may be low-power mode that that partly reduces power consumption to a value above the minimum in order to enable fast/quick activation of the device management apparatus (e.g. by reducing the amount of time required to ramp up the supplied power to a required level).

The nature of a device management command may, for example, dictate whether or not the device management command requires the communication interface to transmit a feedback signal to the remote power management system. Put another way, the differing level of power required to process a device management command may further relate to whether or not the device management command requires the communication interface to transmit a feedback signal. The power supply may thus be adapted to supply power to the communication interface, and the control unit may then be adapted to: control the power supply to operate in the first power mode when the communication interface is not required to transmit the feedback signal; and control the power supply to operate in the second power mode when the communication interface is required to transmit the feedback signal.

However, it is to be understood that there may be a range of device management commands which may impart differing resource or power requirements on the device management apparatus (or components thereof), and the required resources or power implied by such device management commands may or may not depend on whether they require a reply (e.g. feedback signal). Such as the commands requiring or not requiring the MCU uses more power to do calculation, as discussed above.

The device management network may comprise a luminaire management network. Also, the received device management commands may be adapted to be in compliance with a luminaire management protocol. For example, the luminaire management may adhere to the digital multiplex, DMX, standard. Also, where the DMX standard is employed, the received device management commands may be Remote Device Management, RDM, compliant.

An embodiment may be employed in a network-enabled device. Such a network-enabled device may therefore exhibit improved (e.g. more efficient) power consumption performance.

According to an embodiment, there is proposed a device management network comprising: a network-enabled device according to one of the embodiments as discussed above; and a remote power management system in communication with the network-enabled device.

According to another aspect of the invention, there is provided a device management method in a device management apparatus for a device management network including a remote device management system and the device management apparatus, the method comprising: receiving, via a communication interface, device management commands of differing nature from the remote device management system and, transmitting, via the communication interface, a feedback signal to the remote device management system if requested by said device management commands; supplying power, via a power supply operating in a plurality of differing operating modes, to the communication interface of the device management apparatus, wherein the nature of a device management command determines a level of power required by the device management apparatus to process the device management command; and controlling the power supply to operate in one of the plurality of operating modes based on the nature of the received device management command, wherein said controlling comprises: setting the power supply (7) operating under respective predefined switching frequency or duty cycle in a first power mode or in a second power mode of the plurality of operating modes.

In an embodiment, the plurality of differing operating modes may comprise: a first power mode in which the power supply is adapted to supply a first level of power to the device management apparatus; and a second power mode in which the power supply is adapted to supply a second level of power to the device management apparatus, wherein the second level of power is greater than the first level of power. The plurality of differing operating modes may further comprise: a third power mode in which the power supply is adapted to supply a third level of power of a minimal or substantially zero value.

The nature of a device management command may dictate whether or not the device management command requires the communication interface to transmit a feedback signal. In an embodiment, the step of controlling may therefore comprise: controlling the power supply to operate in the first power mode when the communication interface is not required to transmit the feedback signal; and controlling the power supply to operate in the second power mode when the communication interface is required to transmit the feedback signal. The method may further comprise controlling the power supply to operate in a third operating mode when the communication interface of the power management device is neither receiving nor transmitting.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a device management apparatus and method for use in a device management network including a remote device management system.

Embodiments employ the concept of controlling a power supply to operate in one of a plurality of predefined operating modes based on the nature of the received device management command. Based on the realisation that the nature of a received device management command may dictate the resources or power required to process or execute/implement the command, a predefined operating mode of a power supply can be enabled according to the nature of a received management command. In this way, the operation of a power supply can be dynamically controlled according to the nature of received device management commands, thereby providing for more efficient operation of the power supply.

Figure 1:
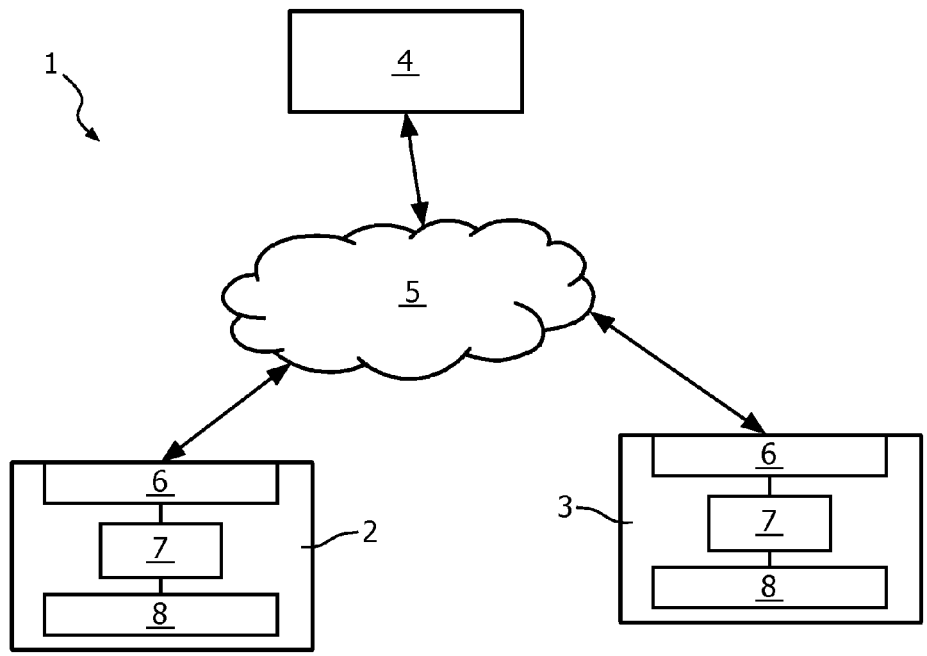
FIG. 1 is a simplified diagram of a device management network according to an embodiment.

Referring to FIG. 1, there is depicted a device management network 1 according to an embodiment. The device management network 1 comprises first 2 and second 3 network-enabled devices communicatively linked with a remote device management system 4 via a communication network 5.

In this example, the first 2 and second 3 network-enabled devices are RDM compliant lights, and the remote device management system 4 is a light management system 4 adapted to output RDM compliant signals/commands for controlling and managing the lights 2,3.

Here, the communication network is an Ethernet-based Local Area Network (LAN), and so the Art-Net protocol is employed in order to communicate RDM signal/commands over the Ethernet LAN 5. However, it will be understood that other suitable communication networks may be employed which enable communication between a remote device management system 4 and one or more network-enabled devices. For example, the communication network 5 may comprise a wireless communication network, the Internet, a LAN, a Wide Area Network, an optical communication network, or any combination thereof.

The device management network 1 may therefore be understood to comprise a luminaire management network 1, wherein the device management commands are in compliance with a luminaire management protocol adhering to the DMX standard.

Both the first network-enabled device 2 and second network-enabled device 3 comprise device management apparatus according to an embodiment. More specifically, in this example, the device management apparatus comprises a communication interface 6, a power supply 7, and a control unit 8 adapted to control the power supply.

The communication interface 6 is adapted to receive device management commands of differing nature from the remote device management system 4 and to transmit a feedback signal if requested. Here, the nature of a device management command dictates a level of power required to process the device management command. Thus, device management commands of differing nature require differing levels of power to be processed. By processing a device management command, it is meant undertaking one or more process steps in order to receive, analyse, execute, or implement the device management command at the managed device. Thus, by way of example, the nature of a device management command may dictate whether or not the communication interface 6 is required to transmit a response to the remote device management system 4, wherein the communication interface 6 requires extra power in order transmit the required response. It will therefore be understood that the nature of a received device management command may provide an indication as to the level of resources or power that may be needed by one or more components of the managed device in order to process the device management command. It should be noted that the above description is for discussing the inherent relationship between certain commands and power consumption, and the embodiment of the invention does not necessarily conduct a step of determining the nature of a received device management command. In fact, the control unit 8 could have a mapping table between device management commands and their respective predefined operation mode. The nature of the device management commands is inherently reflected in the device management command and the operation mode that is selected by the control unit 8 to suit the device management command. Alternatively, the control unit 8 may have two mapping tables: the first table is mapping between the device management command and their respective nature of power consumption such as low, medium and high, and the control unit 8 may have a step of determining the nature; the second table is mapping between the nature of power consumption and predefined operation mode.

The power supply 7 is adapted to supply power to the device management apparatus, For example, the power supply 7 of the present example is adapted to supply power to the communication interface 6, although in other example the power supply 7 may supply to other components of the managed device. Furthermore, the power supply 7 is adapted to operate in a plurality of different and predefined operating modes.

By way of example, the power supply 7 of this example is adapted to operate in either of first and second power modes. In the first power mode, the power supply 7 is adapted to supply a first level of power to the device management apparatus, and, in the second power mode, the power supply 7 is adapted to supply a second, greater level of power to the device management apparatus. The first power mode may therefore be considered to be a low-power mode, whereas the second power mode may be considered to be a high-power mode, for example.

The control unit 8 is adapted to control the power supply 7 to operate in one of the two operating modes based on the nature of a received device management command.

More specifically, in this example, the control unit 8 analyses a received device management command to determine whether or not it requires the communication interface 6 to transmit a feedback signal to the remote device management system. Based on the outcome of this determination, the control unit 8 is adapted to control the power supply 7 to operate in either the first power mode or the second power mode. If the control unit 8 determines that the nature of the received device management command is such that the communication interface 6 is not required to transmit the feedback signal, the control unit 8 controls the power supply to operate in the first, low-power mode. Conversely, if the control unit 8 determines that the nature of the received device management command is such that the communication interface 6 is required to transmit the feedback signal, the control unit 8 controls the power supply to operate in the second, high-power mode. It should be noted that the above function of determining whether or not it requires the communication interface 6 to transmit a feedback signal and control the operational mode could be embodied in locating a proper entry in the above mentioned mapping table between device management command and operating mode.

It will be understood that the control unit 8 of this embodiment is adapted to control the power supplied (by the power supply 7) to the communication interface 6 based on the device management commands that it receives. In this way, the control unit 8 dynamically controls the power supply 7 so that it only supplies a higher level of power when deemed necessary (based on the nature of received device management commands).

Figure 2:
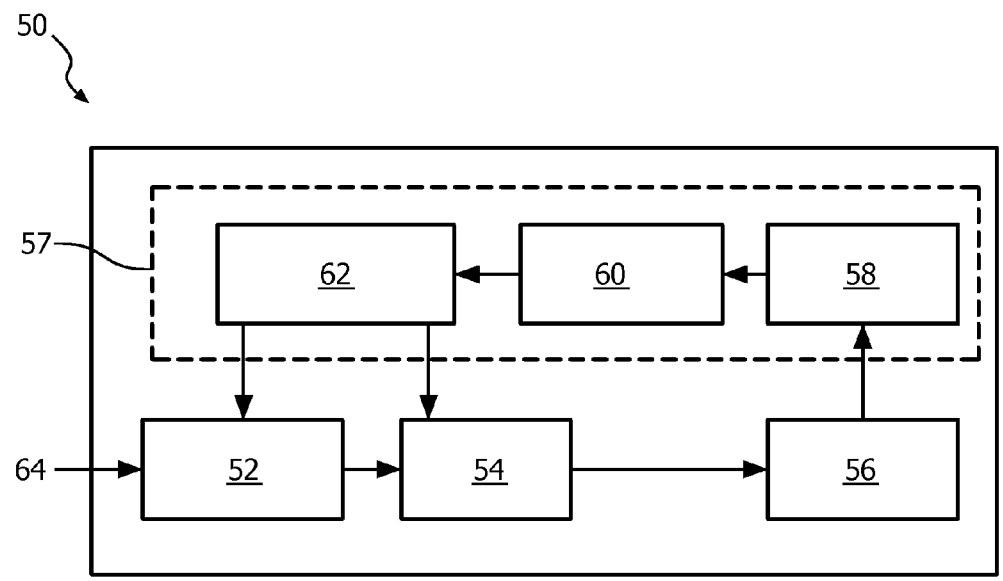
FIG. 2 is a schematic block diagram of a device management apparatus according to an embodiment.

Turning now to FIG. 2, there is depicted a simplified block diagram of a device management apparatus 50 according to an embodiment. Such device management apparatus 50 may, for example, be employed in a network-enabled device such as the lights 2,3 of the embodiment of FIG. 1.

The device management apparatus 50 comprises a communication interface 52, a coupler 54 for isolation, a control unit 56, and a power supply unit 57. The power supply unit is adapted to supply power to the communication interface 52 and the coupler 54 and comprises a switching circuit 58, a transformer 60, and a power supply regulation unit 62.

The communication interface 52 is adapted to receive device management commands 64 from a remote device management system. In this example, the device management commands comprise DMX/RDM signals 64. It will, however, be understood that alternative embodiments may be adapted to receive device management commands adhering to other protocols, standard, or proprietary communication systems/methods.

The communication interface 52 processes received DMX/RDM signals 64 and supplies the processed information to the coupler 54 which, in turn, supplies information about the received signals to the control unit 56.

The control unit 56 is adapted to analyse the information received from the coupler so as to, control the operating mode of the power supply unit 57 based on the nature of a received DMX/RDM signal 64. In more detail, the control unit 56 conducts the above operation to select one predefined operation mode, transmits a control signals to the switching circuit 58 so as to control the switching circuit to work in predefined condition according to the operation mode, the switching circuit in turn adjusts its output to the transformer 60 and then the power supply regulation unit 62. The power supply regulation unit 62 supplies regulated power from the transformer 60 to the communication interface 52 and the coupler 54.

The control unit 56 thus controls the operating mode of the power supply unit 57 based on a nature of received DMX/RDM signal 64. Compared with conventional closed-loop control method required feedback signal from transformer 60 or power supply regulation unit 62 to control unit 56, this open-loop device management apparatus 50 achieves low cost and less complexity.

Here, the control unit 56 is adapted to control the power supplied by the power supply unit 57 by enabling the predefined switching frequency and/or duty cycle of the switching circuit 58. Based on the nature of a received DMX/RDM signal 64 (as reflected in the device management command), the power supplied to the communication interface 56 and/or the coupler 58 can be set and/or varied according to requirements or preferences associated with the nature of the DMX/RDM signal 64.

Figure 3:
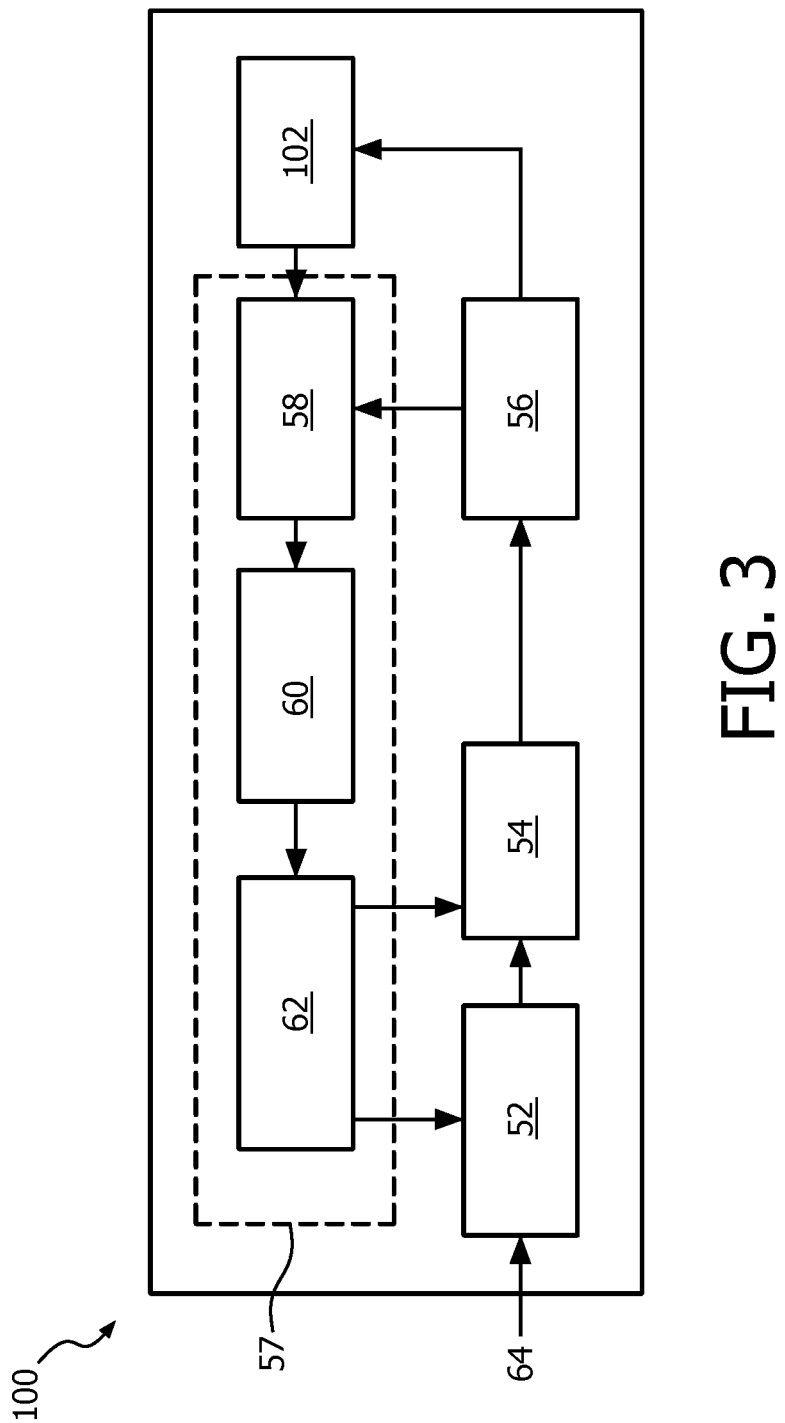
FIG. 3 shows a modified version of the apparatus of FIG. 2.

Referring to FIG. 3, there is depicted a modification the embodiment of FIG. 2. More specifically, the device management apparatus 100 comprises the same arrangement of components as the device management apparatus 50 of FIG. 2, except that the embodiment of FIG. 3 further comprises an input voltage unit 102.

The input voltage unit 102 is adapted to receive a control signal from the control unit 56 and to supply an input voltage to power supply unit 57 based on the received control signal. The input voltage unit 102 is therefore adapted to supply an input voltage for the power supply unit 57, wherein the value of the input voltage can be set, controlled and/or varied by the control unit 56.

Thus, in the embodiment of FIG. 3, in addition or alternative to being able to control the power supply unit 57 by setting the switching frequency and/or duty cycle of the switching circuit 58, the power supply unit 57 can be controlled by selecting an input voltage supplied to the switching circuit 58.

It will therefore be understood that, in any one of the possible operating modes of the power supply unit, the level of power supplied may be variable. In this way, Electromagnetic EMI performance may be optimised, for example. Purely by way of example, the control unit may be adapted to control the switching frequency or duty cycle of the power supply unit so as to vary the power supplied in an operating mode. The control unit may also be adapted to select an input voltage value for the power supply unit to make the power supply unit operate in one of the plurality of operating modes.

Figure 4:
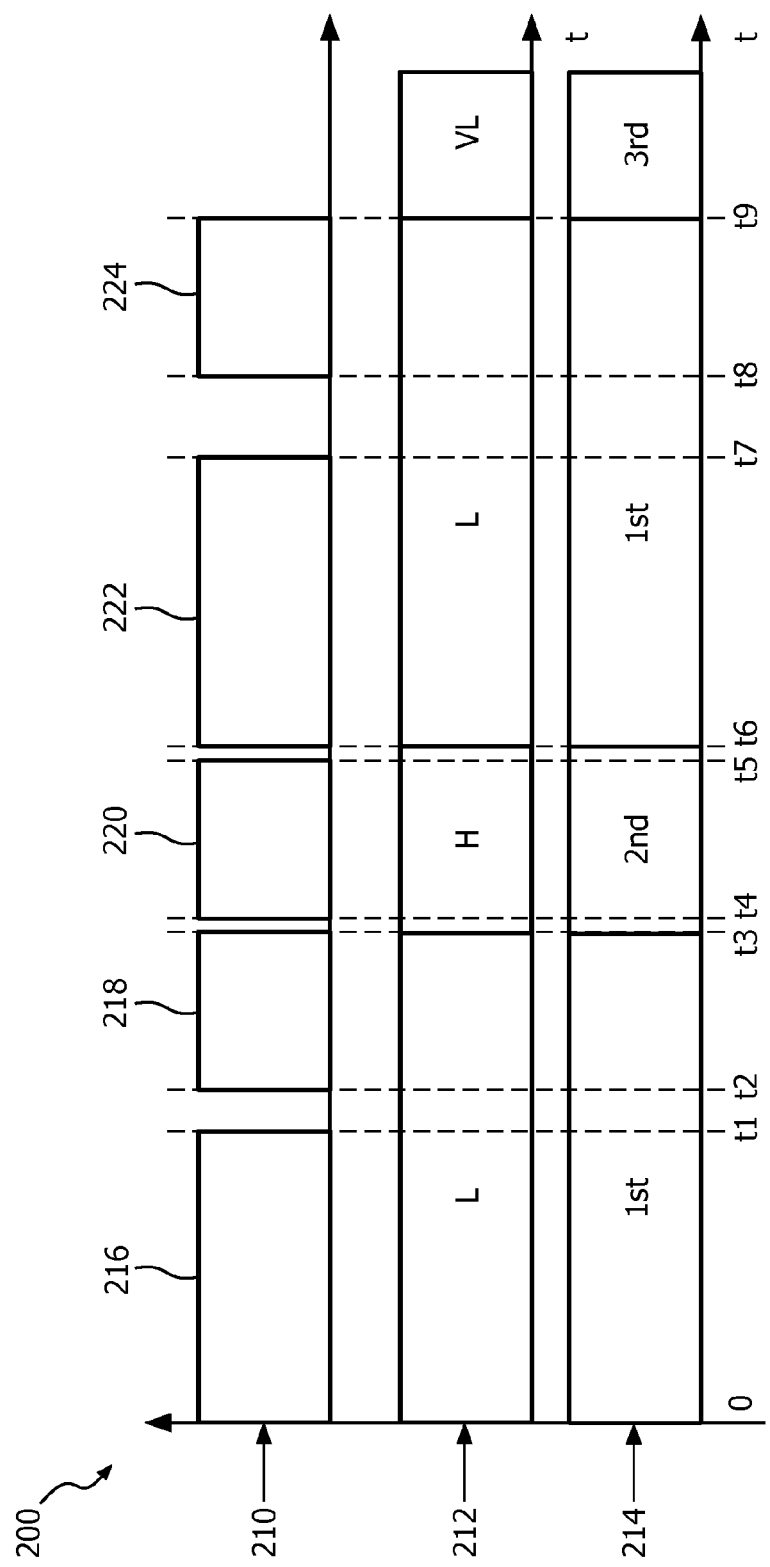
FIG. 4 is a timing diagram illustrating exemplary operation of apparatus according to an embodiment.

Referring now to FIG. 4, there is depicted a timing diagram illustrating an exemplary operation of a device control apparatus according to an embodiment.

Here, the device control apparatus comprises a power supply unit which is adapted to operate in one of three operating modes based on the nature of a received device management command.

In FIG. 4, the top row 210 of signals represents received and transmitted signals. The middle row 212 of signals represents the communication bus load, variable between Low Loading (L), High Loading (H), and Very Low Loading (VL). The bottom row 214 of signals represents the operating status of the power supply unit, variable between a first (low power) mode ($1^{st}$), a second (high power) mode ($2^{nd}$), and a third (sleep/standby/off) power mode ($3^{rd}$).

In a first (low) power mode, the power supply unit is adapted to supply a first (low) level of power to the device management apparatus. In a second (high) power mode, the power supply unit is adapted to supply a second (high) level of power to the device management apparatus. In a third (sleep/standby/off) power mode, the power supply unit is adapted to supply a third (minimal or substantially zero) level of power to the device management apparatus. Thus, the second level of power is greater than the first level of power, and the first level of power is greater than the third level of power. The power supply unit may therefore be considered as being adapted to operate in one of the following three modes: a low power mode, a high power mode, and a sleep/standby/off mode, for example.

The control unit is adapted to control the power supply to operate in a predetermined operating mode based on the nature of a received device management command. Here, the nature of a received device management command relates to the required operation of a communication interface of the device control apparatus in order to process the received device management command. More specifically, a received device management command is categorised into one of two categories based on whether or not the device management command requires the communication interface to transmit a feedback signal.

If a received device management command does not require a feedback signal to be transmitted, it is of a first (low load) nature that imparts reduced resource/power requirements on the communication interface. Thus, when a received device management command is of the first (low load) nature, the control unit controls the power supply unit to operate in the first power mode. Conversely, if a received device management command does require a feedback signal to be transmitted, it is of a second (high load) nature that imparts increased resource/power requirements on the communication interface. Accordingly, when a received device management command is of the second (high load) nature, the control unit controls the power supply unit to operate in the second power mode.

Also, when the communication interface is not required to receive or transmit (for example, when a device management command comprises an "Off" or "Switch Off" instruction), the control unit controls the power supply to operate in the third power mode. In the third power mode, the power supply unit supplies third (minimal or substantially zero) level of power to the communication interface. The third power mode may therefore be considered to be an off or standby mode that reduces the power consumption of the communication interface to a minimum or substantially zero value.

As indicated in the FIG. 4, an exemplary operation of the device control apparatus starts a time t=0. At t=0 the power supply defaults to the first (low power) mode of operation and a device management command 216 is received by the communication interface between t=0 and t=t1. The device management command 216 is determined to be of the first (low load) nature that does not require a feedback signal to be transmitted, and so the control unit controls the power supply to remain operating in the first (low power) mode.

Between t=t2 and t=t3, a new device management command 218 is received by the communication interface. The device management command 218 is of the second (high load) nature that does require a feedback signal to be transmitted, and so the control unit determines that the power supply should operate in the second (high power) mode when the communication interface transmits the feedback signal.

Thus, at t=t3, the control unit controls the power supply to operate in the second (high) power mode and the communication interface transmits the feedback signal 220 from t=t4 to t=t5 whilst be supplied the second (high) level of power from the power supply unit.

At t=t5, the communication interface ends transmission of the feedback signal. In one example (not shown in FIG. 4), the control unit may directly control the power supply to operate in the first (low power) mode. In other words, the power supply unit is controlled to revert back to the first (low power) mode when the high load on the communication interface is removed. In another example, the control unit will wait for the subsequent device management command and determine the operation mode according to the nature of the subsequent device management command. The following shows this example in detail.

A further device management command 222 is received by the communication interface between t=t6 and t=t7. The further device management command 222 is of the first (low load) nature that does not require a feedback signal to be transmitted, and so the control unit controls the power supply to revert back to operating in the first (low power) mode at t=t6.

Between t=t8 and t=t9, a yet further device management command 224 is received by the communication interface. The yet further device management command 224 is determined to comprises an "off" instruction that indicates that the communication interface is no longer required to receive or transmit. The control unit therefore determines that the power supply should operate in the third power mode once receipt of the yet further device management command 224 is complete (at t=t9).

Thus, at t=t9 onwards, the control unit controls the power supply to operate in the third (sleep/standby/off) power mode (e.g. whilst the load on the communication interface is extremely low or substantially zero).

Figure 5:
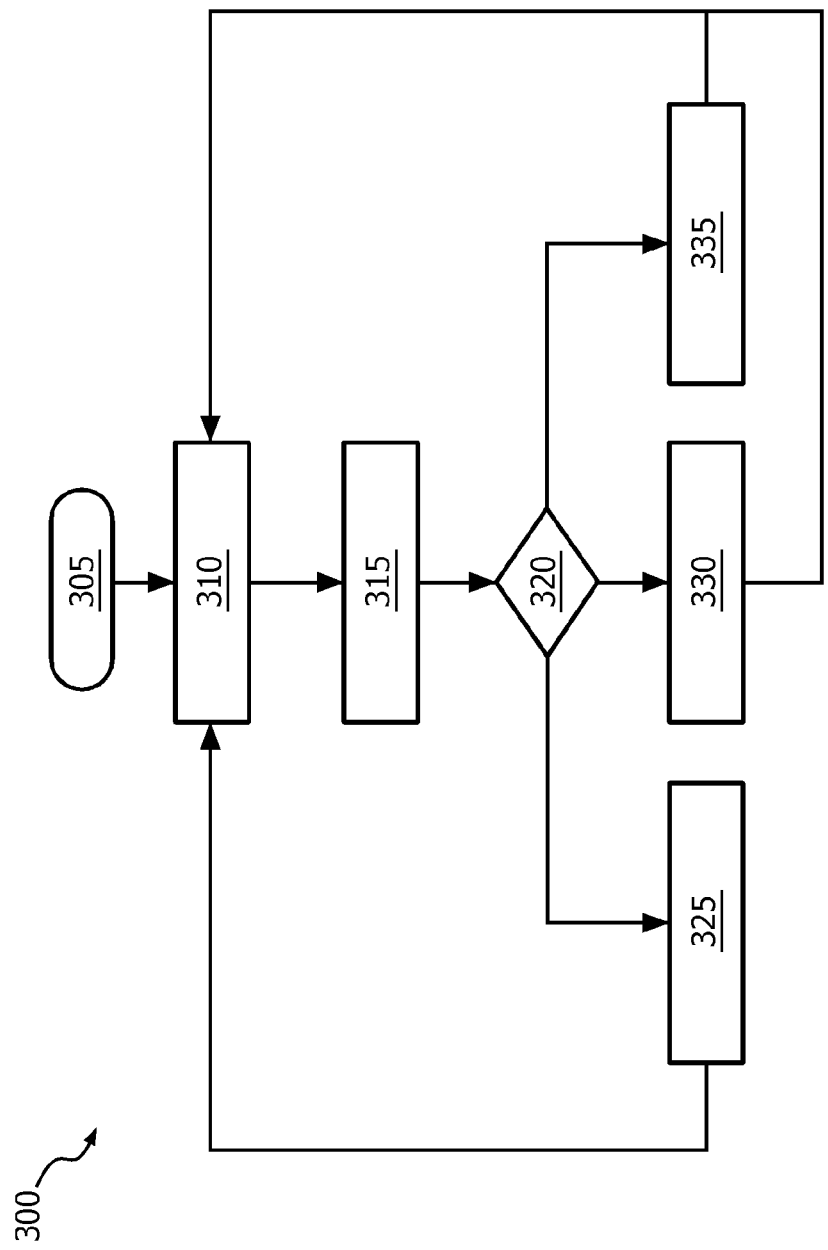
FIG. 5 is a flow diagram depicting a method according to an embodiment.

Turning to FIG. 5, there is shown a flow diagram depicting a device management method 300 according to an embodiment. The method 300 is suitable for use in device management apparatus that may be employed in a device management network including a remote device management system. Here, the device control apparatus comprises: a power supply which is adapted to operate in one of three operating modes; and a control unit adapted to control the power supply to operate in one of the three operating modes based on the nature of a received device management command.

The method starts in step 305 and proceeds to step 310.

In step 310, the device management apparatus receives (via a communication interface, for example) a device management command from a remote device management system.

The method then proceeds to step 315 in which the control unit determines the nature of the received device management command. Here, the control unit analyses the command to assess the level of power required in order to process the received device management command and, based on this assessment, decides which of three possible categories ("1", "2" or "3") of nature the device management command has.

After determining that nature of the command, the method continues to step 320 wherein the next method step is decided based on the nature of the device management command that was determined in step 315.

If the nature of the device management command is determined to be in category "1", the method proceeds to step 325, wherein the control unit controls the power supply to operate in a first operating mode (Mode 1). In the first operating mode (Mode 1), the power supply is adapted to supply a first level of power to the device management apparatus.

If the nature of the device management command is determined to be in category "2", the method proceeds to step 330, wherein the control unit controls the power supply to operate in a second operating mode (Mode 2). In the second operating mode (Mode 2), the power supply is adapted to supply a second level of power to the device management apparatus, the second level of power being greater than the first level of power.

If the nature of the device management command is determined to be in category "3", the method proceeds to step 335, wherein the control unit controls the power supply to operate in a third operating mode (Mode 3). In the third operating mode (Mode 3), the power supply is adapted to supply a third level of power to the device management apparatus, the third level of power being of power of a minimal or substantially zero value (e.g. significantly lower in value than the first level of power).

After each of steps 325, 330 and 335, the method returns to step 310 in which the device management apparatus receives (via a communication interface, for example) a new device management command from a remote device management system. The method then repeats by undertaking the sequence of subsequent methods steps as already described above.

As discussed above, the step of determining the nature can be omitted, and the steps 315, 320, 325, 330 and 335 can be embodied by determining the operation mode according to the received device management command by referring to mapping table, wherein the nature of the received device management command is implicitly reflected in the device management command and the corresponding operation mode.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions and can be processed by a processor, e.g. one or more picoprocessors. These computer program instructions may be implemented as rules of a rules repository and as program instructions specifying the functional units of the parser. Said computer program instructions may be stored in a computer readable medium that can direct a network processor, other programmable data processing apparatus to function in a particular manner, such that the instructions stored in the computer readable medium produce an article of manufacture including instructions which implement the function/act specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a network processor, other programmable data processing apparatus, or other devices to cause a series of operational steps to be performed on the network processor, other programmable apparatus or other devices to produce a computer implemented process such that the instructions which execute on the computer or other programmable apparatus provide processes for implementing the functions/acts specified in the flowchart and/or block diagram block or blocks.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A device management apparatus for use in a device management network including a remote device management system, the device management apparatus comprising:
    a communication interface adapted to receive device management commands of differing nature from the remote device management system and to transmit a feedback signal to said remote device management system if requested by said device management commands, wherein the differing nature of a device management command comprises a differing level of power required to process the device management command, wherein the differing level of power required to process the device management command further relates to whether or not the device management command requires the communication interface to transmit the feedback signal;
a power supply adapted to supply power to the communication interface of the device management apparatus and further adapted to operate in a plurality of differing predefined operating modes; and
a control unit adapted to control the power supply to operate in one of the plurality of operating modes based on the nature of the received device management command, wherein the control unit is adapted to:
set the power supply operating under respective predefined switching frequency or duty cycle in a first power mode or in a second power mode of the plurality of differing predefined operating modes.

2. The device management apparatus of claim 1, wherein
in the first power mode the power supply is adapted to supply a first level of power to the communication interface of the device management apparatus; and
in the second power mode the power supply is adapted to supply a second level of power to the communication interface of the device management apparatus,
the second level of power being greater than the first level of power.

3. The device management apparatus of claim 2, wherein, in the first power mode, the first level of power is variable.

4. The device management apparatus of claim 2, wherein the plurality of differing operating modes further comprises:
a third power mode in which the power supply is adapted to supply a third level of power to the device management apparatus,
the third level of power being lower than the first level of power and of a minimal or substantially zero value.

5. The device management apparatus of claim 4, wherein the control unit is adapted to control the power supply to operate in the third power mode when the communication interface is neither receiving nor transmitting.

6. The device management apparatus of claim 2, wherein the control unit is adapted to: control the power supply to operate in the first power mode when the communication interface is not required to transmit the feedback signal; and control the power supply to operate in the second power mode when the communication interface is required to transmit the feedback signal.

7. The device management apparatus of claim 1, wherein the device management network comprises a luminaire management network, and the received device management commands are in compliance with a luminaire management protocol.

8. The device management apparatus of claim 7, wherein the luminaire management protocol adheres to the digital multiplex, DMX, standard, and optionally wherein the received device management commands are Remote Device Management, RDM, compliant.

9. A network-enabled device comprising a device management apparatus according to claim 1.

10. A device management network comprising:
at least one network-enabled device according to claim 9; and
a remote device management system in communication with the network-enabled device.

11. A device management method in a device management apparatus for a device management network including a remote device management system and the device management apparatus, the method comprising:
receiving, via a communication interface, device management commands of differing nature from the remote device management system and, transmitting, via the communication interface, a feedback signal to the remote device management system if requested by said device management commands;
supplying power, via a power supply operating in a plurality of differing operating modes, to the communication interface of the device management apparatus, wherein the nature of a device management command determines a level of power required by the device management apparatus to process the device management command, wherein the differing level of power required to process the device management command further relates to whether or not the device management command requires the communication interface to transmit the feedback signal; and
controlling the power supply to operate in one of the plurality of operating modes based on the nature of the received device management command, wherein said controlling comprises:
setting the power supply operating under respective predefined switching frequency or duty cycle in a first power mode or in a second power mode of the plurality of differing operating modes.

12. The device management method of claim 11, wherein
in the first power mode the power supply is adapted to supply a first level of power to the device management apparatus; and
in the second power mode in which the power supply is adapted to supply a second level of power to the device management apparatus,
the second level of power being greater than the first level of power.

13. The device management method of claim 11, further comprising controlling the power supply of the device management apparatus to operate in a third power mode when the communication interface of the device management apparatus is neither receiving nor transmitting, wherein in third power mode power supply is adapted to supply a third level of power of a minimal or substantially zero value.

14. The device management method of claim 11, wherein said controlling step comprises:
controlling the power supply to operate in the first power mode when the communication interface is not required to transmit the feedback signal; and
controlling the power supply to operate in the second power mode when the communication interface is required to transmit the feedback signal.

15. A computer program product for use in a device management apparatus for a device management network including a remote device management system, wherein the computer program product comprises a computer-readable storage medium having computer-readable program code embodied therewith, the computer-readable program code configured to perform all of the steps of claim 11.

* * * * *